US010675806B2

(12) United States Patent
Squires et al.

(10) Patent No.: US 10,675,806 B2
(45) Date of Patent: Jun. 9, 2020

(54) ELEVATOR WITH DEBOWING MECHANISM

(71) Applicant: ENTRUST DATACARD CORPORATION, Shakopee, MN (US)

(72) Inventors: Milo B. Squires, Chaska, MN (US); Benjamin H. Sannel, Crystal, MN (US); Jon Wawra, Shakopee, MN (US)

(73) Assignee: ENTRUST DATACARD CORPORATION, Shakopee, MN (US)

( * ) Notice: Subject to any disclaimer, the term of this patent is extended or adjusted under 35 U.S.C. 154(b) by 718 days.

(21) Appl. No.: 15/178,811

(22) Filed: Jun. 10, 2016

(65) Prior Publication Data

US 2016/0361863 A1 Dec. 15, 2016

Related U.S. Application Data

(60) Provisional application No. 62/174,989, filed on Jun. 12, 2015.

(51) Int. Cl.
*G06K 13/00* (2006.01)
*B29C 53/18* (2006.01)
(Continued)

(52) U.S. Cl.
CPC .............. *B29C 53/18* (2013.01); *B32B 37/06* (2013.01); *B65H 29/125* (2013.01); *B65H 29/70* (2013.01);
(Continued)

(58) Field of Classification Search
CPC .................................. B29C 53/18; B41J 13/12
See application file for complete search history.

(56) References Cited

U.S. PATENT DOCUMENTS 4,825,054 A 4/1989 Rust et al.
5,266,781 A 11/1993 Warwick et al.
(Continued)

FOREIGN PATENT DOCUMENTS

JP 2000143068 5/2000

OTHER PUBLICATIONS

The International Search Report and the Written Opinion of the international application No. PCT/US2016/036840, dated Sep. 27, 2016, total 14 pages.

(Continued)

*Primary Examiner* — Galen H Hauth
(74) *Attorney, Agent, or Firm* — Hamre, Schumann, Mueller & Larson, P.C.

(57) ABSTRACT

Techniques are described herein for reducing bowing effects on a substrate while the substrate is being transported, for example in an elevator mechanism, from a first travel path to a second travel path, where the first travel path is offset from the second travel path so that the first travel path is not collinear with the second travel path. The substrate can be any substrate that is bowed and for which one wishes to eliminate or reduce the bow. One specific substrate that can benefit from the techniques described herein are personalized documents such as plastic cards including but not limited to financial (e.g. credit and debit) cards, drivers' licenses, national identification cards, gift cards, loyalty cards, employee badges, and other plastic cards which bear personalized data unique to the card holder and/or which bear other card or document information.

8 Claims, 9 Drawing Sheets

(51) Int. Cl.
*G06K 13/02* (2006.01)
*B65H 29/12* (2006.01)
*B32B 37/06* (2006.01)
*B65H 29/70* (2006.01)
*B32B 38/06* (2006.01)
*B29L 17/00* (2006.01)

(52) U.S. Cl.
CPC .......... *G06K 13/02* (2013.01); *B29L 2017/00* (2013.01); *B29L 2017/006* (2013.01); *B32B 38/06* (2013.01); *B32B 2425/00* (2013.01); *B65H 2301/31124* (2013.01); *B65H 2301/321* (2013.01); *B65H 2301/4474* (2013.01); *B65H 2301/51212* (2013.01); *B65H 2301/512565* (2013.01); *B65H 2402/31* (2013.01); *B65H 2404/1315* (2013.01); *B65H 2404/1422* (2013.01); *B65H 2601/11* (2013.01); *B65H 2601/321* (2013.01); *B65H 2701/1914* (2013.01)

(56) References Cited

U.S. PATENT DOCUMENTS

| | | | |
|---|---|---|---|
| 5,959,278 A * | 9/1999 | Kobayashi | B41J 2/325 |
| | | | 101/232 |
| 6,105,493 A * | 8/2000 | Skubic | B41J 3/387 |
| | | | 101/40 |
| 6,783,067 B2 | 8/2004 | Kreuter et al. | |
| 6,902,107 B2 | 6/2005 | Shay et al. | |
| 7,398,972 B2 | 7/2008 | Schuller et al. | |
| 7,434,728 B2 | 10/2008 | Paulson et al. | |
| 7,784,700 B2 | 8/2010 | Galles et al. | |
| 2002/0134516 A1 | 9/2002 | Ashley et al. | |
| 2002/0144789 A1 | 10/2002 | Sasaki et al. | |
| 2011/0236172 A1 | 9/2011 | Hiyama et al. | |
| 2014/0345787 A1* | 11/2014 | Zaborowski | B29C 53/18 |
| | | | 156/196 |

OTHER PUBLICATIONS

Extended European Search Report, European Patent Application No. 16808349.1, dated Feb. 19, 2019 (7 pages).

* cited by examiner

ELEVATOR WITH DEBOWING MECHANISM

FIELD

This disclosure describes techniques and equipment for reducing bowing effects associated with the processing of substrates, including personalized documents such as plastic cards including but not limited to financial (e.g. credit and debit) cards, drivers' licenses, national identification cards, and other cards which bear personalized data unique to the card holder and/or which bear other card or document information, as well as to passports or passport pages. Particularly, this technical disclosure relates to reducing bowing effects associated with heat lamination and other heat transfer processes which effects may occur during processing of such substrates.

BACKGROUND

Document processing mechanisms and methods used in producing personalized cards and other personalized documents have been employed by institutions that issue such documents. Identity documents, which are often personalized by such systems and methods, include plastic and composite cards, for instance financial (e.g. credit and debit) cards, drivers' licenses, national identification cards, and other cards and documents, such as passports, which are personalized with information unique to the intended document holder.

Document processing mechanism can be designed for relatively small scale, individual document personalization and production. In these mechanisms, a single document to be personalized is input into a processing machine, which typically includes one or two personalization/processing capabilities, such as printing and laminating. These processing machines are often termed desktop processing machines because they have a relatively small footprint intended to permit the processing machine to reside on a desktop. Many examples of desktop processing machines are known, such as the SD or CD family of desktop card printers available from Entrust Datacard Corporation of Shakopee, Minn. Other examples of desktop processing machines are disclosed in U.S. Pat. Nos. 7,434,728 and 7,398,972, each of which is incorporated herein by reference in its entirety.

For large volume batch production of personalized documents, institutions often utilize systems that employ multiple processing stations or modules to process multiple documents at the same time to reduce the overall per document processing time. Examples of such machines include the MX and MPR family of central issuance processing machines available from Entrust Datacard Corporation of Shakopee, Minn. Other examples of central issuance processing machines are disclosed in U.S. Pat. Nos. 4,825,054, 5,266,781, 6,783,067, and 6,902,107, all of which are incorporated herein by reference in their entirety. As with desktop document processing machines, batch processing machines also include printing and laminating capabilities.

Some processing operations in these machines, however, may produce undesired bowing effects in a document. That is, a bend may occur in the document as a result of the processing operation(s) performed on the document. Particularly, this bowing problem can occur as a result of heat lamination of the document and other heat transfer operations that, when performed, may create a bow or bend in the document.

One example of a technique for debowing personalized cards is disclosed in U.S. Pat. No. 7,784,700 which is incorporated herein by reference in its entirety. Another example of a technique for debowing personalized cards is disclosed in U.S. Published Application 2014/0345787 which is incorporated herein by reference in its entirety.

An example of retransfer printing followed by debowing of the card is contained in the Artista® VHD module used in the MX6100™ Card Issuance System available from Entrust Datacard Corporation of Shakopee, Minn. In the VHD module, an elevator mechanism lowers the card from the main card path to a lower card path, where the card is then fed into an image transfer station where a heated roller set transfers a printed image from a retransfer ribbon onto the front surface of the card. The card is next moved to a debowing mechanism where the card is flexed into a reversed bow position. Next, the card is passed to an elevator mechanism which moves the card back up to the main card path.

SUMMARY

Techniques are described herein for reducing bowing effects on a substrate while the substrate is being transported, for example in an elevator mechanism, from a first travel path to a second travel path, where the first travel path is offset from the second travel path so that the first travel path is not collinear with the second travel path. The substrate can be any substrate that is bowed and for which one wishes to eliminate or reduce the bow. One specific substrate that can benefit from the techniques described herein are personalized documents such as plastic cards including but not limited to financial (e.g. credit and debit) cards, drivers' licenses, national identification cards, gift cards, loyalty cards, employee badges, and other plastic cards which bear personalized data unique to the card holder and/or which bear other card or document information, as well as to passports or passport pages.

The reduction of the bowing effects in the substrate can occur immediately after a heat lamination and/or other heat transfer process is performed on the substrate. In the case of personalized documents, the debowing can occur immediately after the document has been laminated on one or both surfaces of the document. Lamination can include any lamination process in which one or more layers of material is added to a surface of the document. Examples of lamination processes include, but are not limited to, retransfer printing, lamination of a protective film, and the like. Any number of other processing steps can occur prior to and/or after lamination, such as printing, magnetic strip programming, chip programming, embossing, indenting, and others known to those having ordinary skill in the art.

In the case of personalized documents such as cards that are being processed in central issuance processing machines and desktop processing machines, because the card is debowed while being transported from the first travel path to the second travel path, the flow of cards in the central issuance processing machines and the desktop processing machines can be improved, and increased debowing time to enhance the amount of debow in the card that occurs is provided, compared to central issuance processing machines and desktop processing machines that provide debowing separate from transport of card from the first travel path to the second travel path.

In one embodiment, the substrate is transported from the first travel path to the second travel path in an elevator mechanism that is movable in a linear direction between the first travel path and the second travel path. A debowing mechanism is provided on the elevator mechanism that is configured to debow the substrate while the substrate is being transported from one travel path to the other travel path. In one embodiment, the first card travel path is substantially parallel to the second card travel path, and the elevator mechanism is movable in a direction that is substantially perpendicular to the first card travel path and the second card travel path.

In one embodiment, the debowing mechanism is a separate mechanism from a substrate transport mechanism, for example substrate transport rollers, on the elevator mechanism that is configured and positioned to transport a substrate onto and from the elevator mechanism. The substrate can be transported from the first travel path onto the elevator mechanism by the transport mechanism. The debowing mechanism then debows the substrate as the elevator mechanism brings the substrate to the second travel path. At the second travel path, the substrate is then transported out of the elevator mechanism and onto the second travel path by the substrate transport mechanism for continued processing of the substrate and/or output of the substrate.

The debowing mechanism can have any construction suitable for debowing the substrates. In one embodiment, the debowing mechanism can be configured to debow the substrate in at least two planes of the substrate, for example in an x-y plane and in a y-z plane. In another embodiment, the debowing mechanism can include four conical rollers that are positioned to contact a first side surface of the substrate adjacent to corners of the substrate, two rollers that are positioned to contact an opposite, second side surface of the substrate adjacent to a center of the second side surface, and where the four conical rollers and the two rollers are actuatable relative to one another in a movement direction that is substantially perpendicular to the first and second side surfaces to cause the substrate to bend in a manner to reduce the bow in the substrate.

In one embodiment, a method of debowing a substrate, such as a card, includes bending the card in a direction opposite of a bow that is present in the card while the card is being transported from a first card travel path to a second card travel path, where the first card travel path is offset from the second card travel path so that the first card travel path is not collinear with the second card travel path. The first and second card travel paths can be offset from one another vertically, horizontally, or at any angle between vertical and horizontal.

In another embodiment, a substrate processing mechanism, such as a card processing mechanism, includes a first card travel path, a second card travel path that is offset from the first card travel path, an elevator mechanism that is movable between the first card travel path and the second card travel path to transport a card from the first card travel path to the second card travel path, and a card debowing mechanism on the elevator mechanism. The card processing mechanism can be part of a central issuance card processing machine or a desktop card processing machine.

As used herein, a processing mechanism, unless otherwise defined in the claims, is intended to encompass a mechanism that performs a processing operation on a substrate that can involve personalization or not involve personalization. For example, applying a transparent protective laminate, perhaps even including a hologram or other non-personalized security feature, is an example of a substrate processing operation that does not involve personalization. Applying a name, address, photograph, account number, employee number, signature, or the like to a substrate are examples of processing operations that involve personalization. A personalization mechanism is intended to encompass a mechanism that performs a processing operation on a substrate that involves personalization. The term processing therefore encompasses both personalization and non-personalization operations performed on a substrate, while the term personalization encompasses personalization operations performed on a substrate.

As used herein, a heat processing operation, unless otherwise defined in the claims, is intended to encompass a processing operation involving the application of heat to a card or other substrate that tends to result in bowing of the card or substrate. Examples of heat processing operations include, but are not limited to, lamination processes in which one or more layers of material is added to a surface of the card or substrate. Examples of lamination processes include, but are not limited to, retransfer printing, lamination of a protective film, and the like.

DRAWINGS

FIG. 1 schematically illustrates an example of a central issuance card processing machine that can utilize the techniques described herein.

FIG. 2 schematically illustrates an example of a card processing mechanism of the central issuance card processing machine of FIG. 1 that includes an elevator mechanism and debowing mechanism.

DETAILED DESCRIPTION

Techniques are described below for reducing bowing effects on a substrate while the substrate is being transported, for example in an elevator mechanism, from a first substrate travel path to a second substrate travel path. The first substrate travel path is offset from the second substrate travel path so that the first travel path is not collinear with the second travel path. The substrate can be any substrate that is bowed and for which one wishes to eliminate or reduce the bow. Typically, the debowing would be performed immediately after a heat processing operation is performed on the substrate, where the heat processing operation results in the creation of the bow in the substrate.

For sake of convenience, the substrates will be described herein as being personalized cards such as plastic cards including but not limited to financial (e.g. credit and debit) cards, drivers' licenses, national identification cards, gift cards, loyalty cards, employee badges, and other plastic cards which bear personalized data unique to the card holder and/or which bear other card or document information. However, the techniques described herein can be applied to other substrates as well including, but not limited to, passports or passport pages.

In addition, for sake of convenience, the cards will be described as being processed in a central issuance card processing machine. However, the card can be processed in other card processing machines including, but not limited to, desktop card processing machines.

In addition, for sake of convenience, the heat processing operation performed on the cards that results in a bow in the cards will be described as being a retransfer printing process where an image printed on a retransfer ribbon is transferred from the ribbon onto a surface of a card by lamination using heat and pressure. However, other heat processing operations can be used including, but not limited to, lamination of a protective film to a card surface.

An elevator mechanism, unless otherwise defined in the claims, is intended to encompass any mechanism that is capable of transporting a substrate, such as a card, from a first travel path to a second travel path where the first travel path is offset from the second travel path so that the first travel path is not collinear with the second travel path. The elevator mechanism can be one that moves in a substantially vertical direction wherein the first and second travel paths are vertically separated from one another. The elevator mechanism can also be one that moves in a substantially horizontal direction wherein the first and second travel paths are horizontally separated from one another. The elevator mechanism can also be one that moves in a direction that is at an angle between substantially vertical and substantially horizontal.

Figure 1:
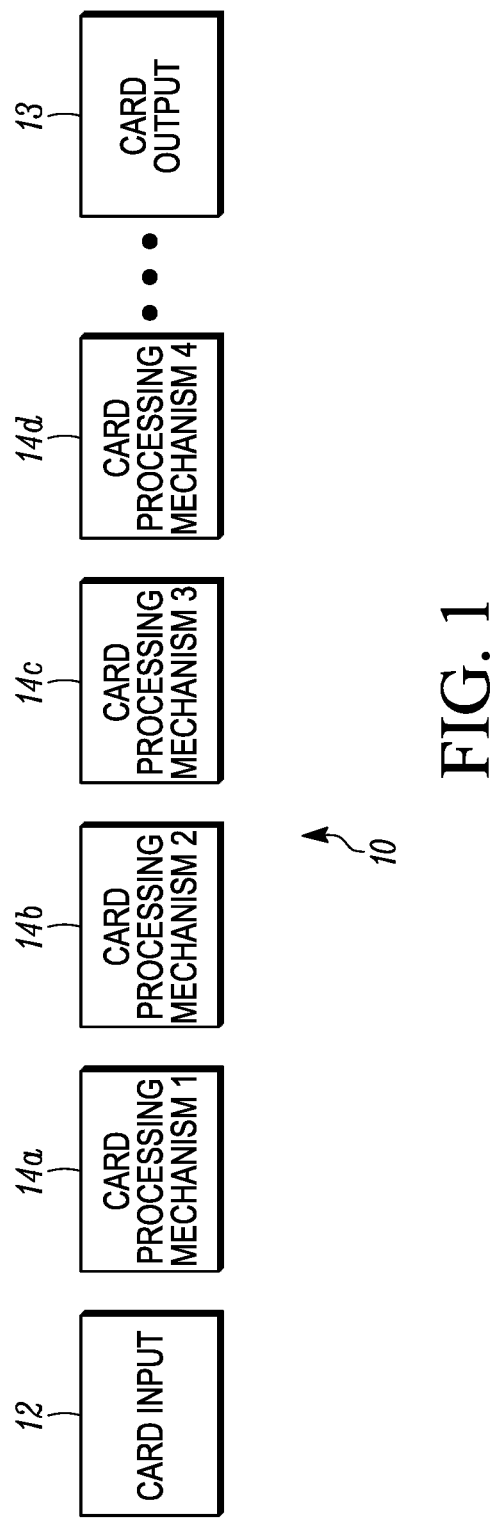

With reference initially to FIG. 1, an example of a central issuance card processing machine 10 is schematically illustrated. The machine 10 can include a card input 12 that holds a plurality of cards waiting to be input for processing in the machine 10, and a card output 13 that holds a plurality of processed cards after they have been processed in the machine 10. In between the input 12 and the output 13 are a plurality of separate card processing mechanisms 14a, b, c . . . n that perform processing operations on the cards. Examples of processing mechanisms 14a, b, c . . . n that can be used include, but are not limited to, one or more magnetic stripe encoding mechanisms for encoding a magnetic stripe on each card; one or more smart card programming mechanisms for programming a smart card chip on each card; one or more embossing mechanisms for creating embossed characters on each card; one or more indenting mechanisms for creating indent characters on each card; one or more printing mechanisms for performing printing, such as retransfer printing and/or direct to card printing, on one or more surfaces of the cards; one or more lamination mechanisms that apply a protective laminate to one or more surfaces of the cards; one or more laser mechanisms for performing laser processing such as laser marking or engraving; one or more cleaning modules that clean one or both surfaces of the cards; one or more verification mechanisms that verify information and data applied to the cards; and other processing mechanisms known in the art.

In operation of the machine 10, cards are input one by one from the card input 12 into the processing mechanism 14a which processes each card. As the processing is completed in each card in the mechanism 14a, the card is fed into the next processing mechanism 14b where it is processed, and then fed into the next processing mechanism 14c where it is processed and then fed into the next processing mechanism 14d. This process is repeated for each processing mechanism, with finished cards then being output into the card output 13. The general construction and operation of the central issuance card processing machine 10 is well known to those of ordinary skill in the art. Examples of central issuance card processing machines include the MX and MPR family of central issuance processing machines available from Entrust Datacard Corporation of Shakopee, Minn., and the machines disclosed in U.S. Pat. Nos. 4,825,054, 5,266,781, 6,783,067, and 6,902,107, all of which are incorporated herein by reference in their entirety.

One of the card processing mechanisms 14a, b, c . . . n of the machine 10 is configured to perform a heat processing operation on the cards. For example, with reference to FIG. 2, one of the card processing mechanisms, for example the card processing mechanism 14d, is configured to perform a retransfer printing process on each card. In this example, the card processing mechanism 14d includes a card entrance 20 through which cards from the immediately adjacent upstream card processing mechanism 14c are input. The card input 20 is disposed along a primary card travel path 22 of the machine 10 along which the cards primarily travel through the machine 10.

A card input through the entrance 20 is fed into a first elevator mechanism 24 that is movable between an upper card travel path 26 and a lower card travel path 28. In some embodiments, the upper card travel path 26 may also be referred to as a primary card travel path since the upper card travel path 26 is collinear with the primary card travel path 22 of the machine 10. In some embodiments, the lower card travel path 28 may also be referred to as an auxiliary card travel path since the lower card travel path 28 is offset from the primary card travel path 26 and from the primary card travel path 22 of the machine 10. In some embodiments, the lower card travel path 28 may also be referred to as a first card travel path and the upper card travel path 26 may be referred to as a second card travel path.

An upper transport mechanism 30 is disposed along the upper card travel path 26 that is configured to aid in transporting a card from the entrance 20 to an output 32 of the mechanism 14d when the card does not need to be transported down to the lower card travel path 28. Cards that exit through the output 32 are fed to the next adjacent downstream processing mechanism (if any) or into the card output 13.

Along the lower card travel path 28, a retransfer printing mechanism 34 is provided for performing a retransfer printing operation on a card. The retransfer printing mechanism 34 includes a retransfer print engine 36 that prints an image onto a retransfer ribbon, and an image transfer station 38 at which the printed image is transferred from the retransfer ribbon onto a surface of the card using heat and pressure. After the image is transferred onto the card, the card is transported by a lower transport mechanism 40 into a second elevator mechanism 42 that is movable between the upper card travel path 26 and the lower card travel path 28. The elevator mechanism 42 includes a debowing mechanism (discussed further below) that is configured to debow the card as the card is transported by the elevator mechanism 42 from the lower card travel path 28 to the upper card travel path 26. The elevator mechanism 42 with integrated debowing mechanism is positioned downstream from the image transfer station 38 so that debowing of the card occurs relatively immediately after the image is transferred to the card.

Figure 2:
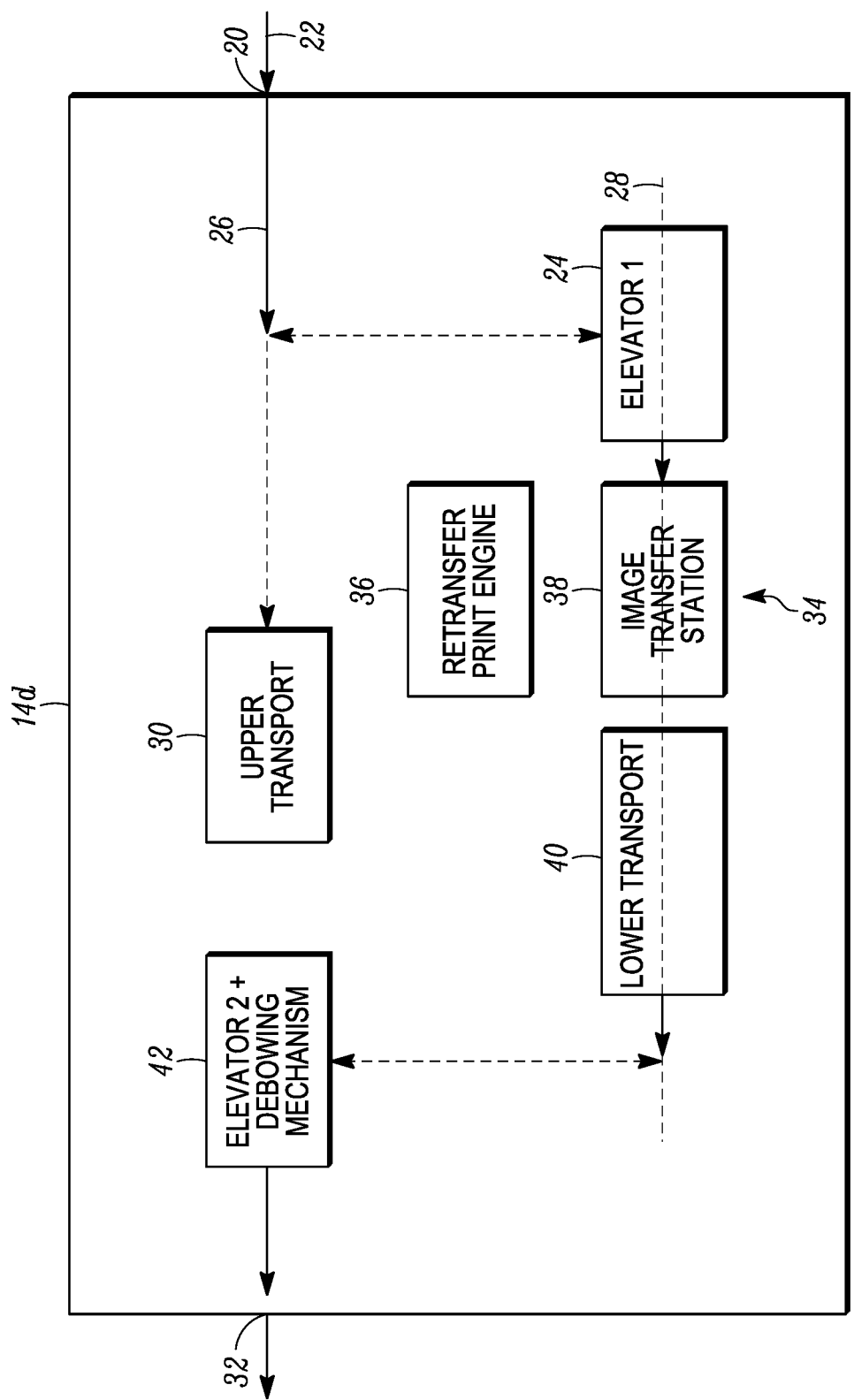

As evident from FIG. 2, the card travel path 26 is offset from the card travel path 28 so that the card travel path 26 is not collinear with the card travel path 28. In one embodiment, the card travel path 26 is substantially parallel to the card travel path 28, and the elevator mechanism 42 is movable in a direction that is substantially perpendicular to the card travel path 26 and to the card travel path 28. However, the card travel paths 26, 28 need not be parallel. In addition, the elevator mechanism 42 need not move in a direction perpendicular to the card travel paths 26, 28.

The card travel path 26 has been described as an upper card travel path while the card travel path 28 has been described as a lower card travel path implying that the card travel path 26 is located vertically above the card travel path 28, in which case the elevator mechanism 42 moves vertically up and down between the card travel paths 26, 28. However, the card travel paths 26, 28 need not be located vertically above one another. Instead, in some card processing machines, for example, the card travel paths 26, 28 can be located offset from one another in a horizontal direction or plane, with the elevator mechanism 42 moving in a horizontal direction between the card travel paths.

Except for the debowing mechanism on the elevator mechanism 42, the construction and operation of the card processing mechanism 14d is similar to the construction and operation of the Artista® VHD module used in the MX6100™ Card Issuance System available from Entrust Datacard Corporation of Shakopee, Minn. One example of operation of the processing mechanism 14d is as follows. In the card processing mechanism 14d, a card is input via the entrance 20. If printing on the card is not required, both of the elevator mechanisms 24, 42 are located at the upper card travel path 26, and the card can be transported along the upper card travel path 26 from the entrance 20, through the elevator mechanism 24, to the upper transport mechanism 30, through the elevator mechanism 42, and to the output 32. If printing on a card is required, the elevator mechanism 24 is located at the upper card travel path 26 and receives the card. The elevator mechanism 24 then lowers the card to the lower card travel path 28 and the card is fed into the image transfer station 38 where the printed image is transferred onto a surface of the card. After the image is transferred, the card is fed by the lower transport mechanism 40 into the second elevator mechanism 42 which is located at the lower card travel path 28. The elevator mechanism 42 then raises the card upward to the upper card travel path 26 and the card is then fed to the output 32.

The processing mechanism 14d differs from the Artista® VHD module in that the elevator mechanism 42 includes an integrated debowing mechanism that moves with the elevator mechanism 42 between the card travel paths 26, 28 and that debows a card as the card is being transported by the elevator mechanism 42 from the card travel path 28 to the card travel path 26. The debowing mechanism can have any configuration that is suitable for debowing the card while on the elevator mechanism 42. An example of a debowing mechanism that can be used is described below with respect to FIGS. 3-5 together with FIGS. 6-8.

Figure 3:
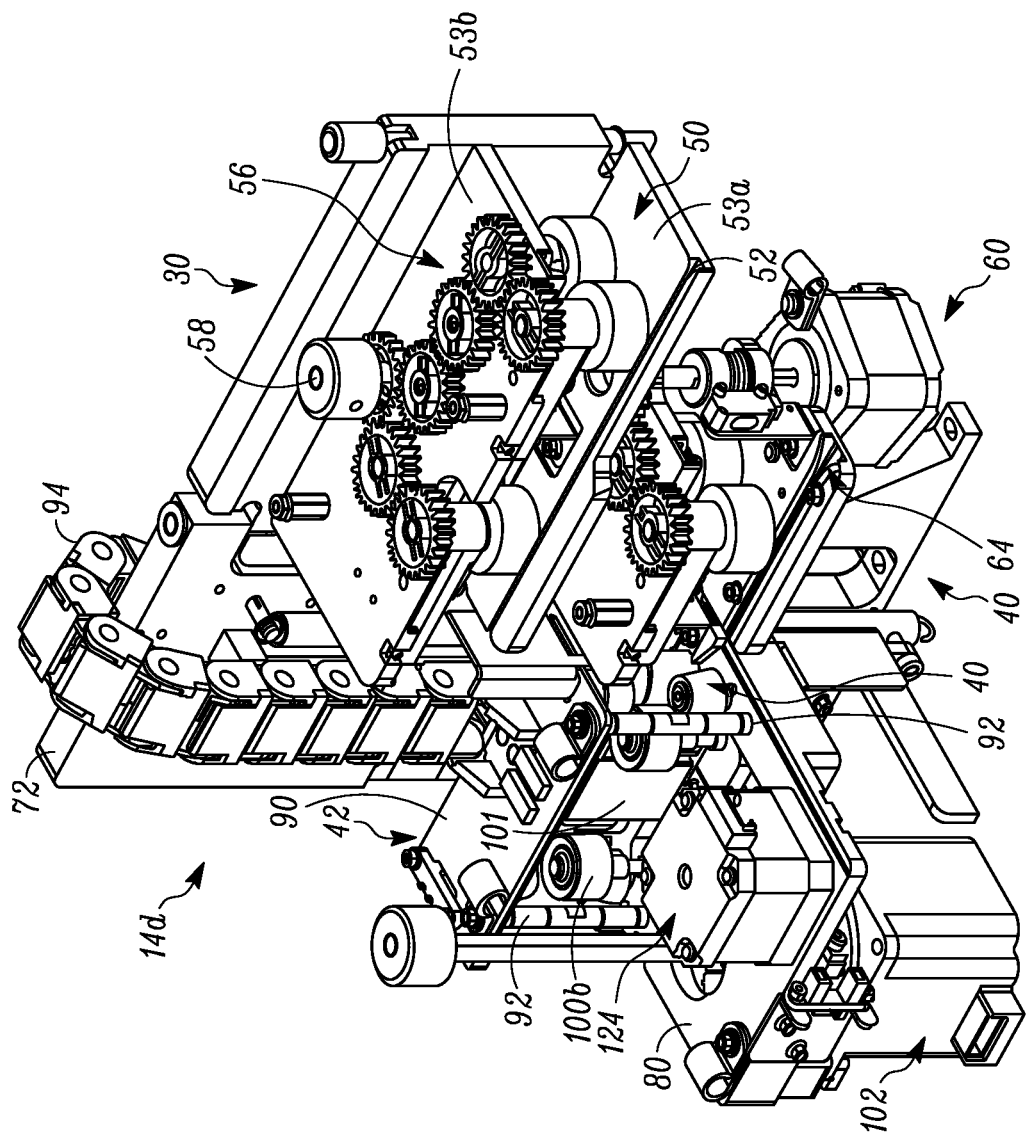
FIG. 3 is a perspective view of an example of a portion a card processing mechanism including an elevator mechanism and a debowing mechanism.
Figure 4:
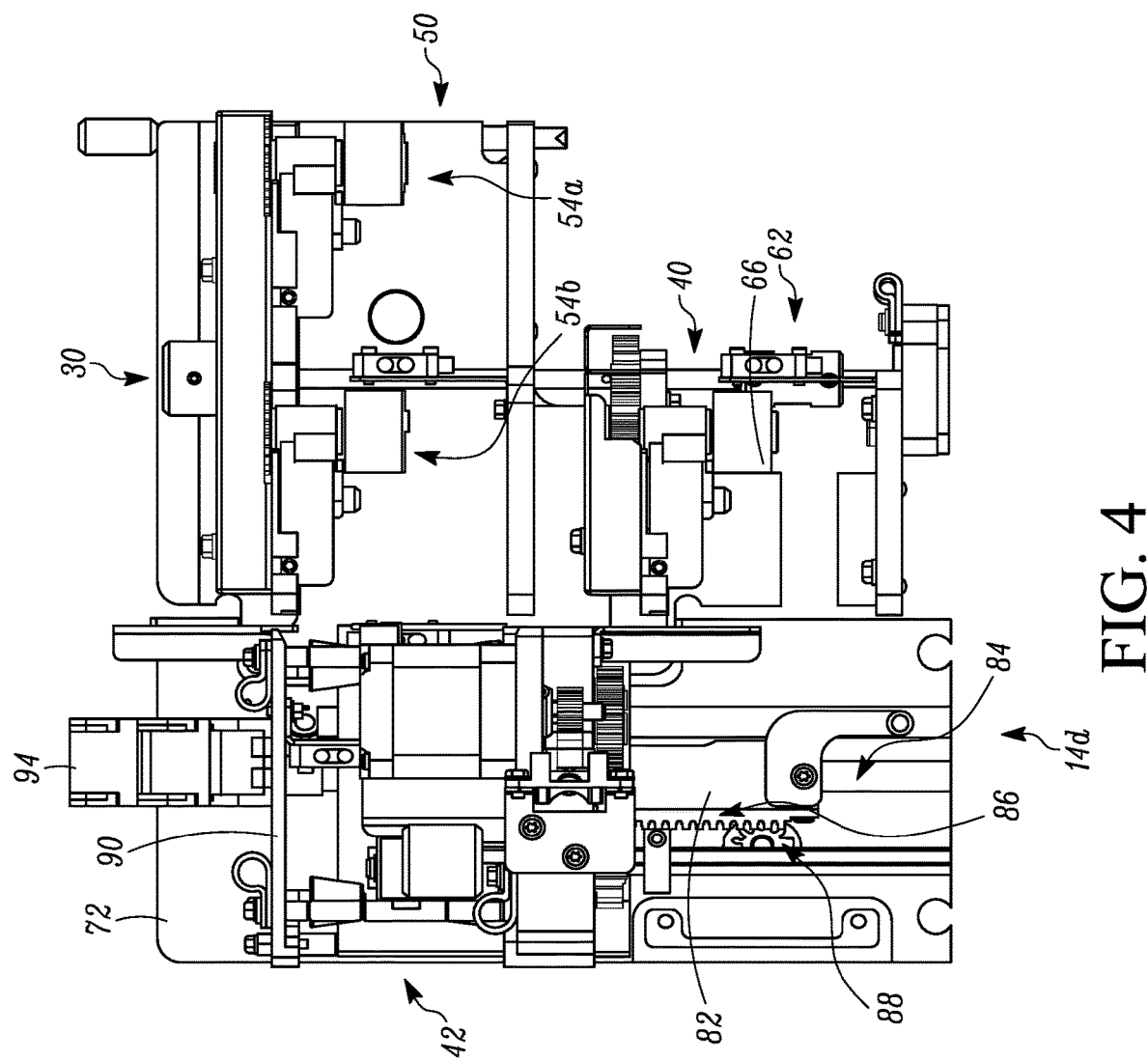
FIG. 4 is a front view of FIG. 3 with the elevator mechanism in a raised position at an upper card path.
Figure 5:
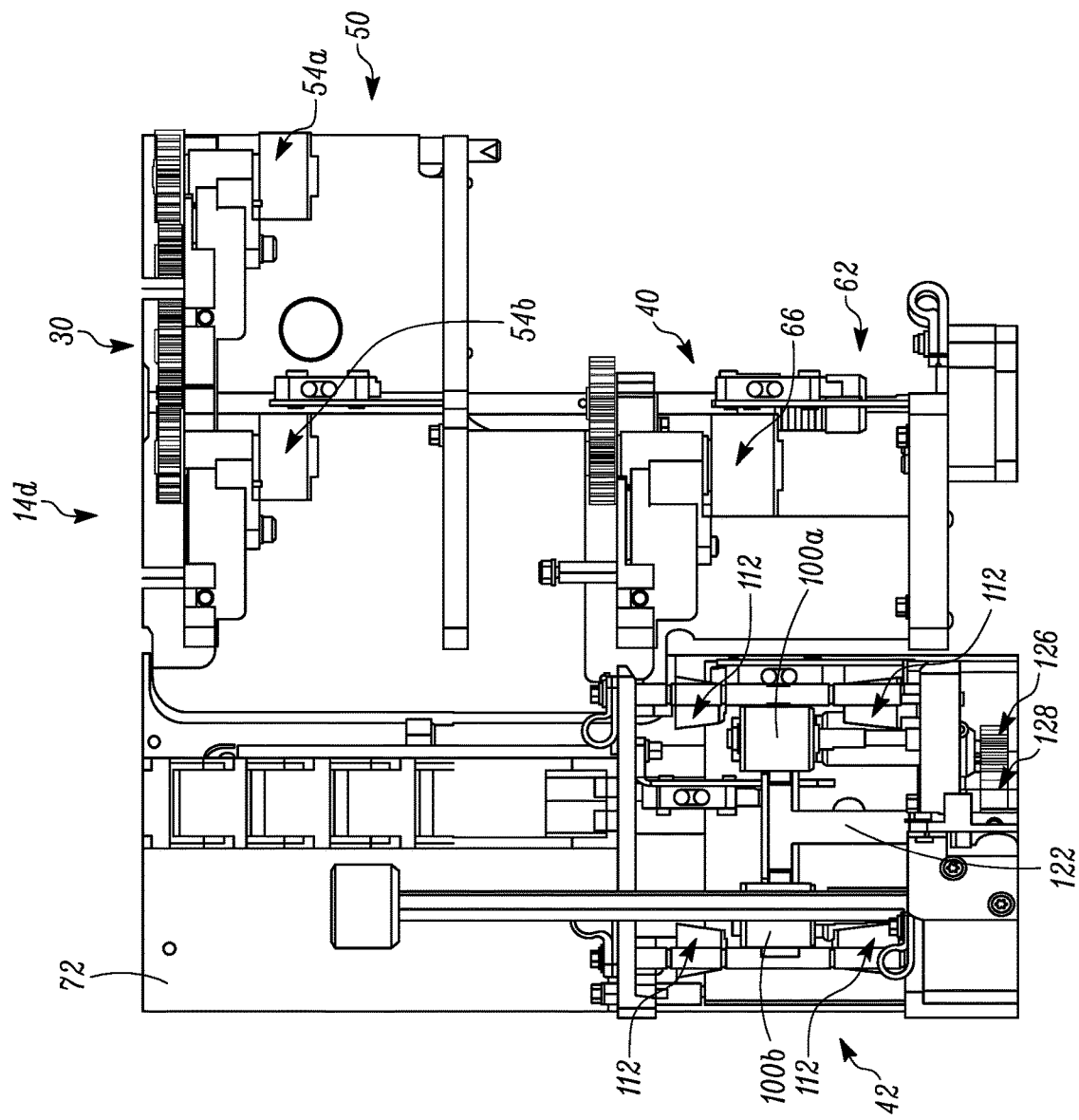
FIG. 5 is a front view similar to FIG. 4 with the elevator mechanism in a lowered position at a lower card path.

FIGS. 3-5 illustrate an example embodiment of a portion the card processing mechanism 14d of FIG. 2. Example constructions of the upper transport mechanism 30, the lower transport mechanism 40, and the elevator mechanism 42 with combined debowing mechanism are illustrated. A card that is bypassing the printing mechanism 34 along the upper card path 26 enters the upper transport mechanism 30 as indicated by the arrow 50 after passing through the elevator mechanism 24 (not shown in FIGS. 3-5). The upper transport mechanism 30 includes a bottom track or slot 52 (FIG. 3) formed in an upper surface of a plate 53a that receives an edge of the card and an upper track or slot (not visible) formed in a bottom surface of a plate 53b opposite the track 52 that receives the opposite edge of the card. In this example two or more pairs of transport rollers 54a, 54b (FIGS. 4 and 5) that engage the card for driving the card through the upper transport mechanism 30. The transport rollers 54a, 54b are driven by a drive mechanism, for example a plurality of gears 56, that are driven by a drive shaft 58 connected to an actuating motor 60.

With respect to the lower transport mechanism 40, after exiting the image transfer station 38 the card on the lower travel path 28 enters the lower transport mechanism 40 as indicated by the arrow 62. The lower transport mechanism 40 includes a track or slot 64 (FIG. 3) that formed in an upper surface of a plate 65a that receives an edge of the card and an upper track or slot (not visible) formed in a bottom surface of a plate 65b opposite the track 64 that receives the opposite edge of the card. In this example one or more pairs of transport rollers 66 (FIGS. 4 and 5) that engage the card for driving the card through the lower transport mechanism 40. The transport rollers 66 are driven by a drive mechanism, for example a plurality of gears 68, that are driven by the drive shaft 58 connected to the actuating motor 60.

Figure 9:
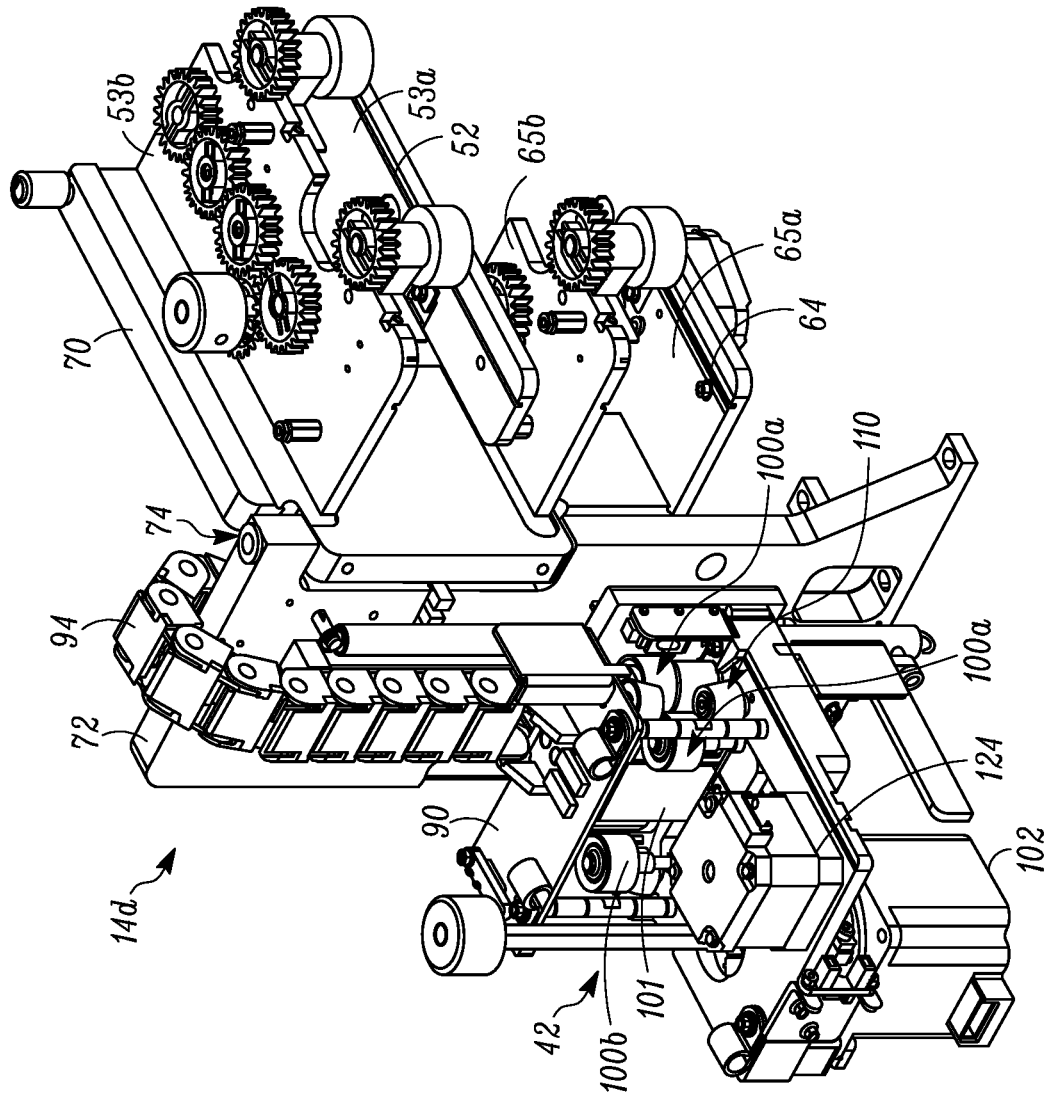
FIG. 9 is a perspective view similar to FIG. 3 but with card transport stations of the card processing mechanism pivoted to an access position.

In one embodiment, the upper transport mechanism 30 and the lower transport mechanism 40 can be part of a single, unitary, common assembly that has a first, operative position (FIGS. 3-5), and a second, access position (FIG. 9) where the upper transport mechanism 30 and the lower transport mechanism 40 can be moved out of the upper travel path 26 and the lower travel path 28. For example, as best seen in FIG. 9, the upper transport mechanism 30 and the lower transport mechanism 40 can both be mounted on a plate 70. The plate 70 is pivotally mounted to a plate 72 which supports the elevator mechanism 42 by a pivot shaft 74. The pivot shaft 74 allows the plate 70 with the upper and lower transport mechanisms 30, 40 mounted thereto to pivot between the first, operative position (FIGS. 3-5) where the upper and lower transport mechanisms 30, 40 are in-line with the upper and lower card travel paths 26, 28, respectively, and the second, access position (FIG. 9) where the upper and lower transport mechanisms 30, 40 are out of line with the upper and lower card travel paths 26, 28, respectively. This pivoting movement of the upper and lower transport mechanisms 30, 40 is useful to facilitate clearing of any card that may jam in the upper and lower transport mechanisms 30, 40 or jam on the elevator mechanism 42.

The mechanism for moving the elevator mechanism 42 up and down between the travel paths 26, 28 can be any mechanism for moving the elevator mechanism 42 up and down. In general, referring to FIGS. 3-5 along with FIG. 9, the elevator mechanism 42 includes a platform 80 that is movable up and down via a slide 82 that is slidably disposed on a slide rail 84 (FIG. 4). The slide 82 is fixed to the platform 80, and a toothed rack 86 (FIG. 4) is fixed to the slide 82. A pinion gear 88 is engaged with the toothed rack 86, with the pinion gear 88 being driven in opposite directions by a suitable reversible electric motor (not shown) mounted on the backside of the plate 72. The upper end of the elevator mechanism 42 includes a plate 90 that is spaced from the platform 80 by a plurality of stand-offs 92. A chain mechanism 94 is attached at one end to the plate 90 and extends up and over the plate 72 to the backside thereof.

At least two pairs of transport rollers 100a, 100b (best seen in FIGS. 3, 5 and 9) are provided on the elevator mechanism 42 for transporting a card onto and from the elevator mechanism 42. A card guide plate 101 is disposed between the roller pairs 100a, 100b that guides the card into the nip of the second transport roller pair 100b. In the elevator mechanism 42, there are no card tracks or slots formed in the platform 80 or the plate 90 that prevent the edges of the card from moving forward out of the card path. The guide plate 101 helps to ensure that the card stays within the card path until it is in the nips of both of the transport roller pairs 100a, 100b. The guide plate 101 can also move forward with movable debow rollers (described below) to allow the card to flex forward. Rotation of the transport rollers 100a, 100b during transport of a card onto and from the elevator mechanism 42 is caused by a reversible electric motor 102 having an output shaft that is suitably connected to the transport rollers 100a, 100b by a conventional drive train (not shown).

Figure 6:
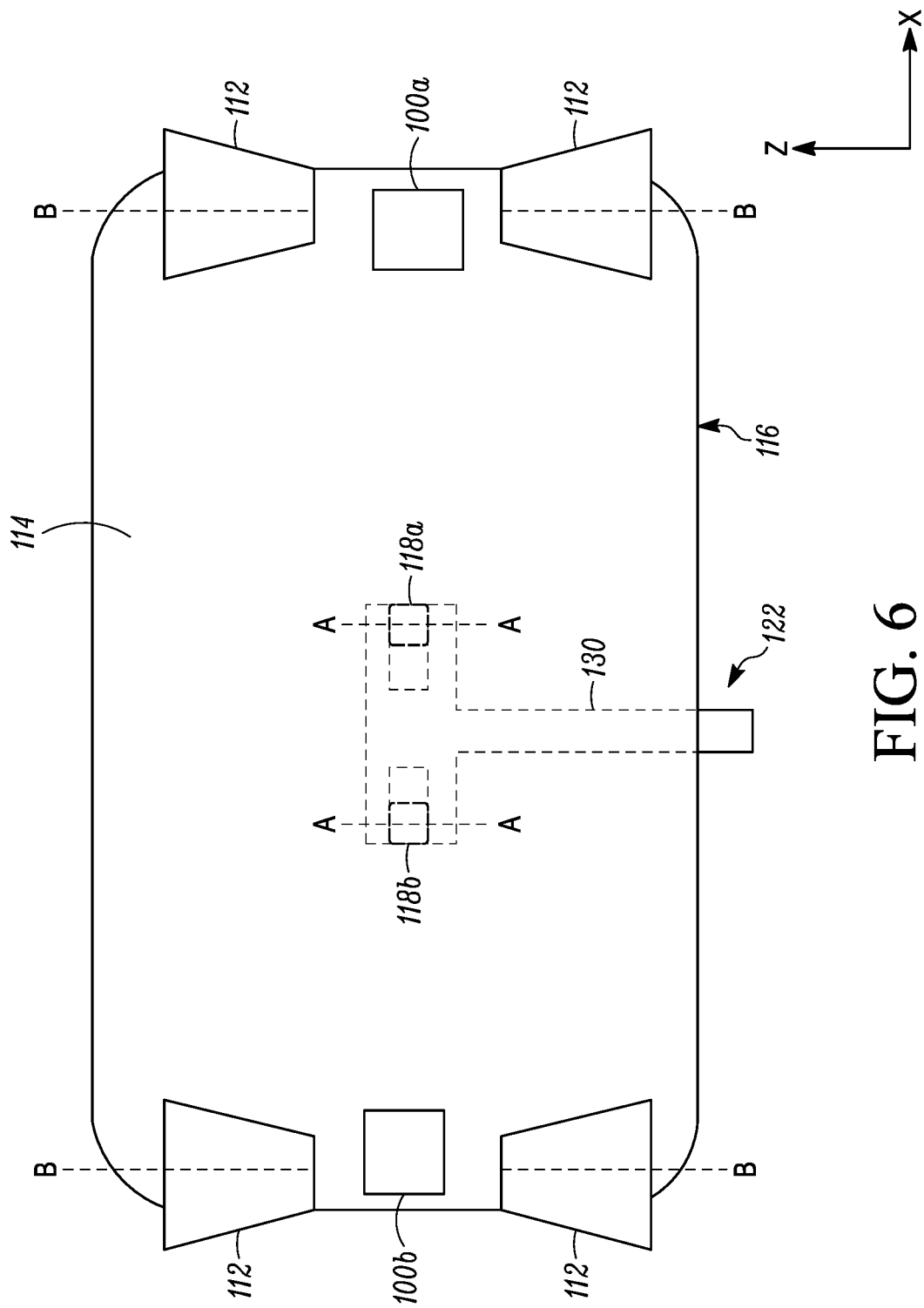
FIG. 6 is a front view illustrating positioning of elements of the debowing mechanism and card transport mechanism relative to a card.

The elevator mechanism 42 further includes a debowing mechanism 110 that is configured to debow the card while the card resides in the elevator mechanism 42 and while the elevator mechanism 42 is transporting the card from the card travel path 28 to the card travel path 26. The debowing mechanism 110 can have any construction that is suitable for debowing the card while the card is on the elevator mechanism 42 and being lifted to the card travel path 26. With reference to FIGS. 3-5 and 9, together with FIGS. 6-8, one non-limiting example of the debowing mechanism 110 can include four conical rollers 112 that are positioned to contact a first side surface 114 of a card 116 adjacent to corners of the card as best seen in FIG. 6. The debowing mechanism 110 can further include two rollers 118a, 118b that are positioned to contact a second side surface 120 of the card 116 adjacent to a center of the second side surface 120. The second side surface 120 of the card 116 is opposite to the first side surface 114. In another embodiment, the rollers 112 can be positioned contact the second side surface 120 while the rollers 118a, 118b can be positioned to contact the first side surface 114.

Figure 7A:
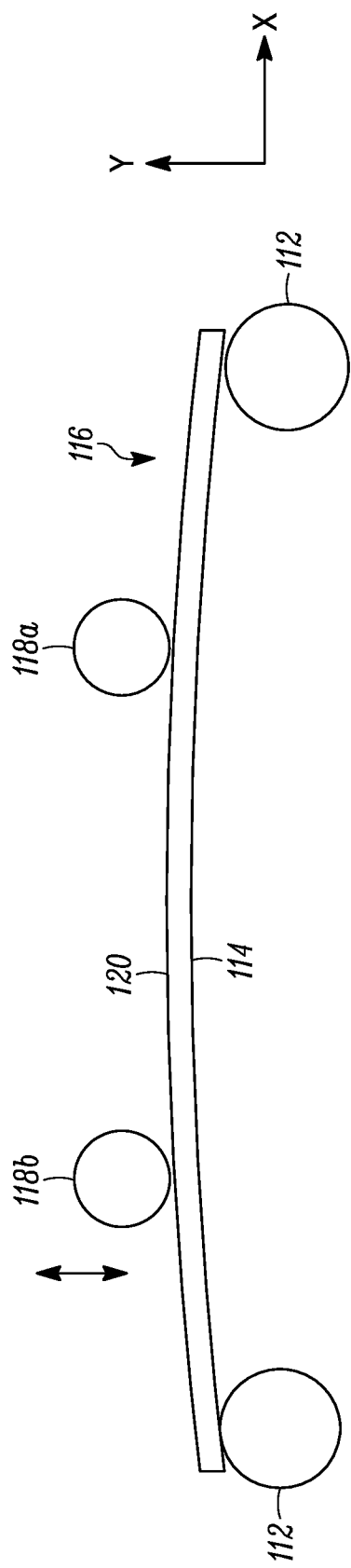
FIG. 7A is a top view illustrating positioning of elements of the debowing mechanism relative to a card prior to debowing.
Figure 7B:
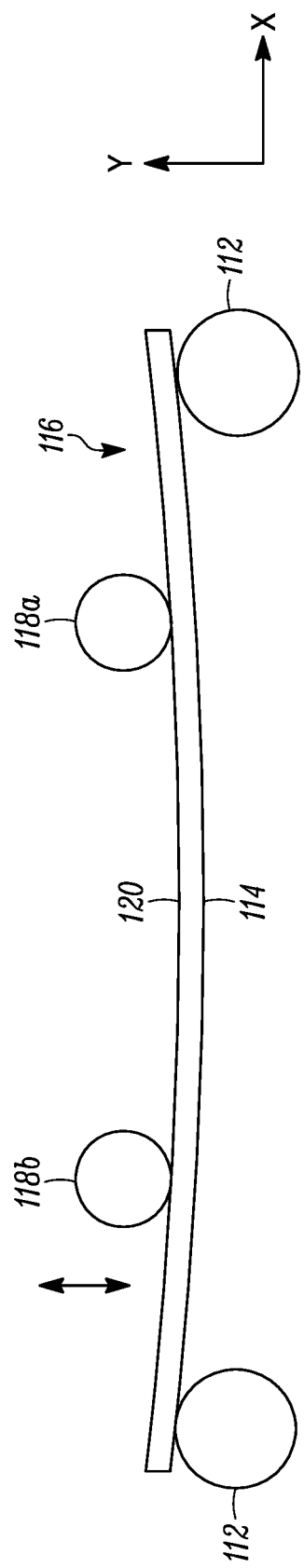
FIG. 7B is a top view similar to FIG. 7A but with the debowing mechanism actuated to debow the card in a first plane.
Figure 8:
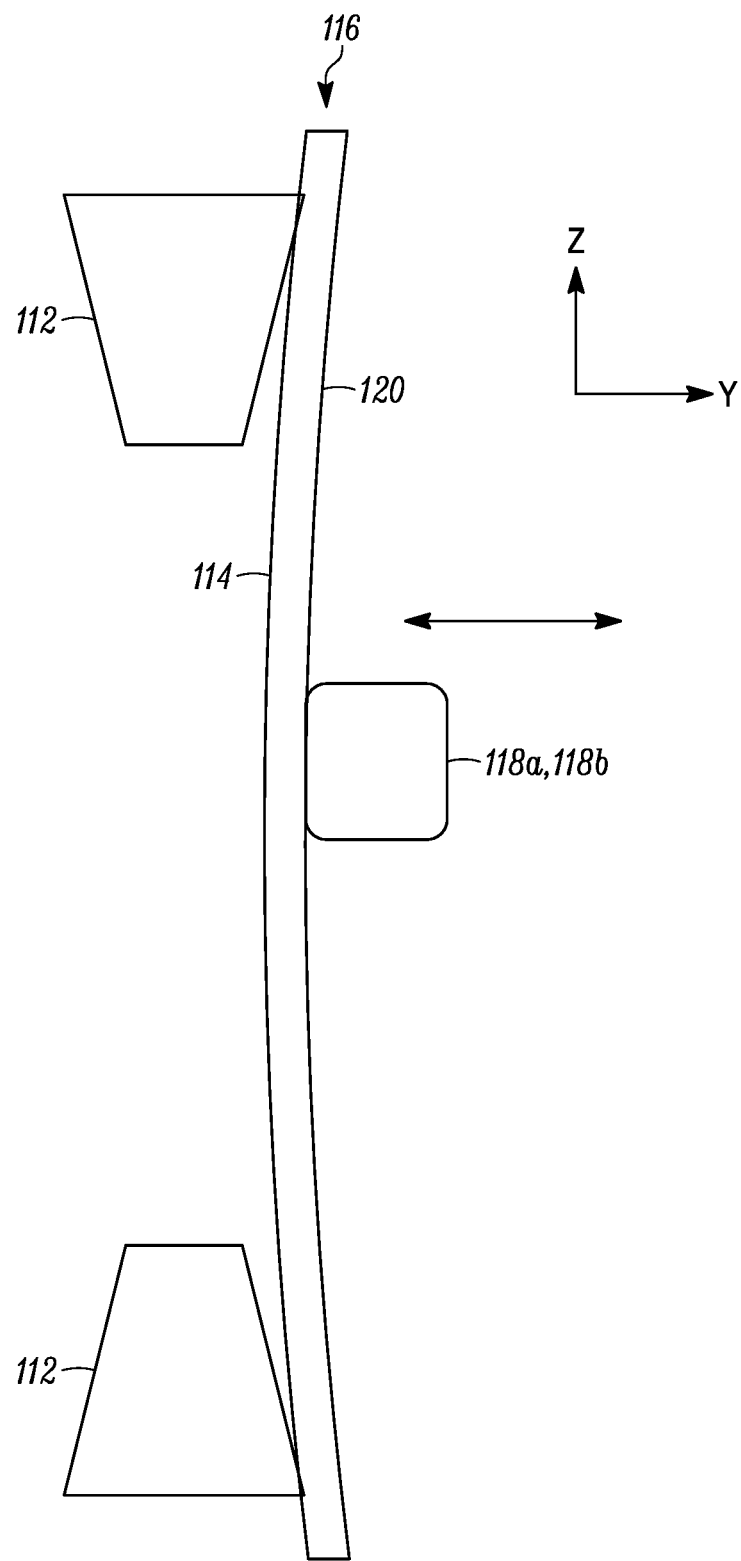
FIG. 8 is a side view illustrating positioning of elements of the debowing mechanism relative to a card with the debowing mechanism actuated to debow the card in a second plane.

As discussed further below, in this example, the four conical rollers 112 and the two rollers 118a, 118b are actuatable relative to one another in a movement direction that is substantially perpendicular to the first and second side surfaces 114, 120 to cause the card 116 to bend in a manner to reduce a bow in the card. In one embodiment, the four conical rollers 112 are fixed in position and the two rollers 118a, 118b are movable in a y-axis direction toward and way from the card 116 as indicated in FIGS. 7A, 7B and 8. In one embodiment, the two rollers 118a, 118b are mounted on a T-shaped mounting bar 122 that is selectively movable toward and away from the card 116 so that the two rollers 118a, 118b move simultaneously. Referring to FIGS. 3, 5, and 9, movement of the bar 122 is controlled by a reversible electric motor 124 that drives a pinion gear 126 (FIG. 5) that in turn is engaged with a toothed rack 128 that is fixed to the bar 122. As the pinion gear 126 rotates, it drives the bar 122 in a linear direction along the y-axis direction depending upon the direction of rotation of the drive shaft of the motor 124. In another embodiment, the rollers 112 can be mounted so as to be actuatable toward and away from the card 116 in the y-axis direction, while the rollers 118a, 118b are fixed in position. In yet another embodiment, the rollers 112 and the rollers 118a, 118b can be mounted so as to be actuatable toward and away from the card 116 in the y-axis direction.

With reference to FIG. 6, the bar 122 includes a stem portion 130 that extends in a z-axis direction and a head portion 132 that extends in an x-axis direction. Each of the rollers 118a, 118b is rotatably mounted to the head portion 132 at opposite ends thereof so that the rollers 118a, 118b can rotate about a rotation axis A-A that extends in the z-axis direction. In addition, each conical roller 112 is mounted to the platform 80 and to the plate 90 in a manner so that each roller 112 is rotatable about a rotation axis B-B that extends in the z-axis direction. Other than being rotatable about the axes B-B, the rollers 112 are fixed in position and are not movable in the y-axis, x-axis or z-axis directions.

As best seen in FIGS. 6 and 8, the rollers 112 are oriented so that the tapers face one another with the lower rollers 112 oriented so that the taper faces upward and the upper rollers 112 oriented so that the taper faces downward toward the lower rollers 112. The rollers 112 are spaced apart from one another in the z-axis direction as well as in the x-axis direction, and are located so as to engage the surface 114 near the four corners of the card 116. On the other hand, the rollers 118a, 118b are positioned to contact the surface 120 near the center (both in the z-axis direction and the x-axis direction) of the card 116. When the rollers 118a, 118b are actuated toward the card 116 in the y-axis direction as indicated in FIGS. 7A, 7B and 8, the card 116 is caused to bend or flex in two planes, a y-x plane or from left to right (FIG. 7B) and a z-y plane or from top to bottom (FIG. 8). The conical shape of the rollers 112 allows the surface 114 of the card 116 to better conform to the surface of the rollers 112 as the card bends. Further, the rotation of the rollers 112, 118a, 118b accommodates movement between the card surfaces 114, 120 and the rollers 112, 118a, 118b when the card is flexed as shown in FIG. 7B. The bending of the card by the debowing mechanism creates a reverse bow in the card 116 that is cup shaped and better counteracts the bowing that is initially present in the card after the image is transferred onto the card.

As depicted in FIG. 7A, the card 116 initially enters the elevator mechanism 42 and the debowing mechanism 110 with a bow in one direction that results from transferring the printed image onto the card surface in the image transfer station 38. In FIGS. 7B and 8, the debowing mechanism 110 bends or bows the card 116 in the reverse direction as the card 116 is being lifted by the elevator mechanism 42 to the upper card path 26 to reduce or remove the initial bow in the card 116.

The debowing mechanism 110 described herein is not limited to use on the elevator mechanism 42. Instead, the debowing mechanism 110 can be used by itself in a card processing mechanism where it is desirable to reduce or eliminate bowing on a card after a heat processing operation is performed on the card that results in a bow in the card.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A card processing mechanism, comprising:
   a first card travel path;
   a second card travel path that is offset from the first card travel path;
   an elevator mechanism that is movable between the first card travel path and the second card travel path to transport a card from the first card travel path to the second card travel path; and
   a card debowing mechanism on the elevator mechanism.

2. The card processing mechanism of claim 1, wherein the first card travel path is substantially parallel to the second card travel path, and the elevator mechanism is movable in a direction that is substantially perpendicular to the first card travel path and the second card travel path.

3. The card processing mechanism of claim 1, wherein the card debowing mechanism comprises:
- four conical rollers that are positioned to contact a first side surface of the card adjacent to corners of the card;
- two rollers that are positioned to contact a second side surface of the card adjacent to a center of the second side surface, the second side surface is opposite the first side surface; and
- the four conical rollers and the two rollers are actuatable relative to one another in a movement direction that is substantially perpendicular to the first and second side surfaces to cause the card to bend.

4. The card processing mechanism of claim 1, wherein the first card travel path is an auxiliary card travel path, and a printing mechanism is disposed along the first card travel path that is configured to print on the first or second side surface of the card;
- the second card travel path is a primary card travel path that includes a card inlet to the card processing mechanism and a card outlet from the card processing mechanism.

5. The card processing mechanism of claim 4, wherein the printing mechanism comprises a retransfer printer with a print engine and an image transfer station.

6. The card processing mechanism of claim 1, further comprising card transport rollers on the elevator mechanism that are positioned to transport a card onto and from the elevator mechanism.

7. The card processing mechanism of claim 1, wherein the card debowing mechanism is configured to bend a card that is on the elevator mechanism in an x-y plane and in a y-z plane.

8. A central issuance card processing machine that includes a card processing mechanism having:
- a first card travel path;
- a second card travel path that is offset from the first card travel path;
- an elevator mechanism that is movable between the first card travel path and the second card travel path to transport a card from the first card travel path to the second card travel path; and
- a card debowing mechanism on the elevator mechanism.

\* \* \* \* \*